United States Patent
Nakatsuka et al.

[11] Patent Number: 5,986,424
[45] Date of Patent: Nov. 16, 1999

[54] CONTROL SYSTEM AND CONTROL METHOD

[75] Inventors: Takashi Nakatsuka; Atsumi Hashimoto; Yasushi Mukai, all of Toyonaka; Kiyoshi Ohishi, Nagaoka, all of Japan

[73] Assignee: Matsushita Electric Industrial Co., Ltd., Osaka, Japan

[21] Appl. No.: 09/026,588

[22] Filed: Feb. 20, 1998

[30] Foreign Application Priority Data

Feb. 21, 1997 [JP] Japan ................................ 09-37595

[51] Int. Cl.$^6$ ................................................ G05B 19/408
[52] U.S. Cl. ....................... 318/568.22; 318/615; 318/12; 364/166
[58] Field of Search ........................ 364/149, 150, 364/152, 157, 164, 165, 166; 318/508.11, 508.19, 508.22, 615, 12

[56] References Cited

U.S. PATENT DOCUMENTS

| | | | |
|---|---|---|---|
| 4,821,190 | 4/1989 | Patil | 701/68 |
| 5,101,148 | 3/1992 | Yamashita et al. | 318/603 |
| 5,331,265 | 7/1994 | Torii et al. | 318/610 |
| 5,341,078 | 8/1994 | Torii et al. | 318/568.22 |
| 5,374,884 | 12/1994 | Koren et al. | 318/632 |
| 5,389,867 | 2/1995 | Adachi et al. | 318/601 |
| 5,418,441 | 5/1995 | Furukawa | 318/568.22 |
| 5,442,270 | 8/1995 | Tetsuaki | 318/568.22 |
| 5,545,957 | 8/1996 | Kubo et al. | 318/432 |
| 5,598,077 | 1/1997 | Matsubara et al. | 318/568.22 |
| 5,729,111 | 3/1998 | Ogura et al. | 318/623 |

FOREIGN PATENT DOCUMENTS

| | | |
|---|---|---|
| 62-155348 | 7/1987 | Japan . |
| 4-314109 | 11/1992 | Japan . |

*Primary Examiner*—Brian Sircus
*Attorney, Agent, or Firm*—Pearne, Gordon, McCoy & Granger LLP

[57] ABSTRACT

A control system which comprises a reduction gear unit containing gears, a motor being disposed on an input side of said reduction gear unit, a sensor for detecting a turning angle of said motor, and control means for inputting output from said sensor and controlling turning of said motor. The control system further includes gear output angle variation estimation means for estimating a gear output angle variation of said reduction gear unit based on the motor turning angle. An angle transmission error is estimated based on the motor turning angle, whereby load tip locus accuracy can be improved without lowering responsivity of the control system.

21 Claims, 10 Drawing Sheets

CONTROL SYSTEM AND CONTROL METHOD

BACKGROUND OF THE INVENTION

1. Field of the Invention

This invention relates to a control system and a control method of an electric motor for controlling a torsion system containing an angle transmission error of a reduction gear unit used with a robot, etc.

2. Description of the Related Art

Angle transmission error correction of a reduction gear unit 6 in a torsion system containing an angle transmission error of a reduction gear unit used with a robot, etc., in prior art will be discussed. As shown in a block diagram of FIG. 10, motor current Im controlled by control means 1 is converted into torque Kt·Im in a torque constant term 9 in a motor 2 and the torque Kt·Im is converted into speed ωm in a motor dynamics term 10 expressed by the reciprocal of the sum of motor shaft inertia Jm and motor shaft viscous resistance Dm. The speed ωm is converted into motor turning angle θm in an integration term 11. Further, the motor turning angle θm is multiplied by reduction gear ratio 1/Rg in the reduction gear unit 6 and the result is converted into output angle θg to which an angle transmission error is added, then the conversion result is output. By the way, as shown in FIG. 11, the reduction gear unit 6 and a load 8 are connected by a spring component 7, thus torsion angle θs of the difference between the output angle θg of the reduction gear unit 6 and load position θL of the load 8 occurs. Further, the torsion angle θs is multiplied by spring constant Ks in a spring constant term 14 and is converted into a torsion torque. This torsion torque acts on the load 8 as an action force and is converted into speed ωL in a load dynamics term 15 expressed by the reciprocal of the sum of load inertia JL and load shaft viscous resistance DL, then the speed ωL is output in an integration term 16 as the load position θL. Torsion torque also occurs in the motor 2 as a reaction force. Thus, control of the reduction gear unit 6 in the control system in the prior art is only to execute conversion to the output angle θg by multiplying the motor turning angle θm by the reduction gear ratio 1/Rg; an angle transmission error occurring at the time is not clarified. For example, as shown in Japanese Patent Laid-Open No. Sho 62-155348, disturbance torque appearing at motor shaft end is all assumed to be an angle transmission error of a reduction gear unit 6 and such a correction signal to cancel the disturbance torque is generated by correction means 30 and is added to a speed command and a torque command, thereby correcting the angle transmission error for improving load tip locus precision. Alternatively, as shown in Japanese Patent Laid-Open No. Hei 4-314109, responsivity of a control system is lowered in a vibration area caused by an angle transmission error, thereby reducing vibration.

In the conventional methods, control is not applied to an accurate angle transmission error and is performed only with the disturbance torque of the reaction force of the motor 2 also containing load disturbance occurring due to change of the load 8, thus there is a limit to control performance improvement and it is also difficult to improve performance in introduction of modern control theory requiring a control target model.

That is, disturbance is all assumed to occur in an angle transmission error in the conventional angle transmission error compensation, thus disturbance occurring in an angle transmission error cannot be discriminated from disturbance occurring in a load and there is a limit to a decrease in a load tip error. Since a control design is prepared using modern control theory without clarifying (modeling) an accurate control target of the reduction gear unit 6, an accurate design based on the modern control theory requiring an accurate control target model cannot be carried out and control performance cannot be improved.

SUMMARY OF THE INVENTION

The invention has been made to solve the above problems with the prior art, and therefore an object of the invention is to provide a control system and a control method which are capable of accurately modeling a reduction gear unit and improving control performance of a torsion system containing an angle transmission error of the reduction gear unit.

To achieve the above object, according to a first configuration of the invention, there is provided a control system comprising a reduction gear unit containing gears, a motor being disposed on an input side of the reduction gear unit, a sensor for detecting a turning angle of the motor, and control means for inputting output from the sensor and controlling turning of the motor, characterized by gear output angle variation estimation means for estimating a gear output angle variation of the reduction gear unit based on the motor turning angle.

According to a second configuration of the invention, there is provided a control system comprising a reduction gear unit containing gears, a motor being disposed on an input side of the reduction gear unit, a sensor for detecting a turning angle of the motor, and control means for inputting output from the sensor and controlling turning of the motor, characterized by gear output angle variation estimation means for estimating a gear output angle variation of the reduction gear unit based on the motor turning angle, gear ratio variation estimation means for estimating a gear ratio variation of the reduction gear unit based on the motor turning angle, and gear friction force estimation means for estimating a gear friction force of the reduction gear unit based on the motor turning angle.

In a third configuration of the invention, the gear output angle variation estimation means used in the first or second configuration estimates the gear output angle variation of the reduction gear unit with a function consisting of the motor turning angle and a phase angle between the motor turning angle and the gear turning angle.

In a fourth configuration of the invention, in the second configuration, the gear output angle variation estimation means estimates the gear output angle variation of the reduction gear unit using a function consisting of the motor turning angle and a phase angle between the motor turning angle and the gear turning angle, the gear ratio variation estimation means estimates the gear ratio variation of the reduction gear unit using a function consisting of the motor turning angle and a phase angle between the motor turning angle and the gear turning angle, and the gear friction force estimation means estimates the gear friction force of the reduction gear unit using a function consisting of the motor turning angle and a phase angle between the motor turning angle and the gear turning angle.

In a fifth configuration of the invention, in the third or fourth configuration, a trigonometric function is used as the function consisting of the motor turning angle and a phase angle between the motor turning angle and the gear turning angle.

In a sixth configuration of the invention, in the third or fourth configuration, the function used with the gear output angle variation estimation means is multiplied by a reciprocal function of position response to generate a position feedback signal.

In a seventh configuration of the invention, in any of the third to sixth configurations, phase angle estimation means for estimating the phase angle from a motor driving current and motor rotation speed is further included.

In an eighth configuration of the invention, in any of the first to seventh configurations, a load tip position or speed of a load connected to output of the reduction gear unit and a torsion angle of the tip of the load are input to the control means for suppressing vibration of the load.

In a ninth configuration of the invention, in any of the first to seventh configurations, state amount estimation means for estimating a load tip position or speed of a load connected to output of the reduction gear unit and a torsion angle of the tip of the load from a motor driving current and motor rotation speed or the motor turning angle is further included.

According to a tenth configuration of the invention, there is provided a control system comprising a reduction gear unit containing gears, a motor being disposed on an input side of the reduction gear unit, a sensor for detecting a turning angle of the motor, and control means for inputting output from the sensor and controlling turning of the motor, characterized by state amount estimation means having a gear output angle variation constant with a gear output angle variation component of the reduction gear unit replaced with a constant value, a gear ratio variation constant with a gear rate variation component of the reduction gear unit replaced with a constant value, and a gear friction force constant with a gear friction force component of the reduction gear unit replaced with a constant value for estimating a load tip position or speed of a load connected to output of the reduction gear unit and a torsion angle of the tip of the load from a motor driving current and motor rotation speed or the motor turning angle.

Next, a first method of the invention is a method of controlling a motor based on output from control means and driving a reduction gear unit by the motor for controlling desired output, the method comprising the steps of detecting a turning angle of the motor and estimating a gear output angle variation of the reduction gear unit from the detected motor turning angle.

A second method of the invention is a method of controlling a motor based on output from control means and driving a reduction gear unit by the motor for controlling desired output, the control method comprising the steps of detecting a turning angle of the motor and estimating a gear output angle variation, a gear ratio variation, and a gear friction force of the reduction gear unit from the detected motor turning angle.

In a third method of the invention, in the first or second method, the gear output angle variation of the reduction gear unit is estimated with a function consisting of the motor turning angle and a phase angle between the motor turning angle and the gear turning angle.

In a fourth method of the invention, in the second method, the gear ratio variation, and the gear friction force of the reduction gear unit are estimated each with a function consisting of the motor turning angle and a phase angle between the motor turning angle and the gear turning angle.

In a fifth method of the invention, in the third or fourth method, a trigonometric function is used as the function consisting of the motor turning angle and a phase angle between the motor turning angle and the gear turning angle.

In a sixth method of the invention, in the third or fourth method, the function consisting of the motor turning angle and a phase angle between the motor turning angle and the gear turning angle is multiplied by a reciprocal function of position response to generate a signal used for performing position feedback control for the gear output angle variation of the reduction gear unit.

In a seventh method of the invention, in any of the third to sixth methods, the step of estimating the phase angle from a motor driving current and motor rotation speed is further included.

In an eighth method of the invention, in any of the first to seventh methods, a load tip position or speed of a load connected to output of the reduction gear unit and a torsion angle of the tip of the load are input to the control means for suppressing vibration of the load.

In a ninth method of the invention, in any of the first to seventh methods, the step of estimating a load tip position or speed of a load connected to output of the reduction gear unit and a torsion angle of the tip of the load from a motor driving current and motor rotation speed or the motor turning angle is further included.

A tenth method of the invention is a method of controlling a motor based on output from control means and driving a reduction gear unit by the motor for controlling desired output, the method comprising the steps of replacing a gear output angle variation component of the reduction gear unit with a constant value, replacing a gear rate variation component of the reduction gear unit with a constant value, replacing a gear friction force component of the reduction gear unit with a constant value, estimating a load tip position or speed of a load connected to output of the reduction gear unit and a torsion angle of the tip of the load from a motor driving current and motor rotation speed or the motor turning angle, and controlling output to the motor from the gear output angle variation component, the gear ratio variation, the gear friction force, and the estimated torsion angle.

An eleventh method of the invention is a method of controlling a motor based on output from control means and driving a reduction gear unit by the motor for controlling desired output, wherein load vibration is suppressed based on a reaction force transmitted from a load connected to output of the reduction gear unit via the reduction gear unit to the motor.

According to the first configuration and the first method of the invention, the gear output angle variation of the reduction gear unit can be estimated based on the motor turning angle, thus the motor turning angle, namely, the motor is controlled, whereby a load tip locus error caused by an angle transmission error can be decreased.

Next, according to the second configuration and the second method of the invention, in addition to the gear output angle variation of the reduction gear unit, a torsion torque variation and a gear friction force each represented by a gear ratio variation can also be estimated based on the motor turning angle, thus the motor turning angle, namely, the motor is controlled, whereby a load tip locus error caused by an angle transmission error can be furthermore decreased.

Next, according to the third configuration and the third method of the invention, the gear output angle variation of the reduction gear unit is estimated as a periodic function of the motor turning angle, whereby the motor turning angle can be easily controlled and a load tip locus error caused by an angle transmission error can be easily decreased.

Next, according to the fourth configuration and the fourth method of the invention, in addition to the gear output angle variation of the reduction gear unit, a gear ratio variation and a gear friction force are also estimated each as a function of the motor turning angle, whereby the motor turning angle can be easily controlled and a load tip locus error caused by an angle transmission error can be easily and furthermore decreased.

Next, according to the fifth configuration and the fifth method of the invention, an angle transmission error of the reduction gear unit is approximated with a trigonometric function of the motor shaft position consisting of the motor turning angle and motor and gear phase angles, whereby the error factors can be separated, detected, and handled. Thus, the motor can be controlled in a simple configuration and a load tip locus error caused by an angle transmission error can be decreased.

Next, according to the sixth configuration and the sixth method of the invention, an angle transmission error of the reduction gear unit is expressed by a periodic function of the motor turning angle, only a gear output angle variation is converted into motor shaft end, and the result is multiplied by a reciprocal function of position response for performing position feedback control, whereby an accurate angle transmission error correction can be made.

Next, according to the seventh configuration and the seventh method of the invention, the phase angle of a gear output angle error of the reduction gear unit is estimated from the motor current and motor rotation speed, whereby an angle transmission error can be corrected in real time.

Next, according to the eighth configuration and the eighth method of the invention, an angle transmission error of the reduction gear unit is decomposed into a gear output angle variation, a gear ratio variation, and a gear friction force and their respective error factors are handled as motor turning angle functions, whereby state feedback control containing an angle transmission error term can be designed and control performance can be improved.

Next, according to the ninth configuration and the ninth method of the invention, an angle transmission error of the reduction gear unit is decomposed into a gear output angle variation, a gear ratio variation, and a gear friction force and their respective error factors are handled as motor turning angle functions, whereby state feedback control and state amount estimater containing an angle transmission error term can be designed, so that control performance can be improved.

Next, according to the tenth configuration and the tenth method of the invention, an angle transmission error of the reduction gear unit is decomposed into a gear output angle variation, a gear ratio variation, and a gear friction force and their respective error factors can be built in a state equation as constants, thus simple and accurate state feedback control can be designed and control performance can be improved.

Next, according to the eleventh method of the invention, the reduction gear ratio is also considered for the reaction force of torsion torque on the motor, whereby a more accurate control target model can be identified and control performance can be improved.

DETAILED DESCRIPTION OF THE PREFERRED EMBODIMENTS

Figure 1:
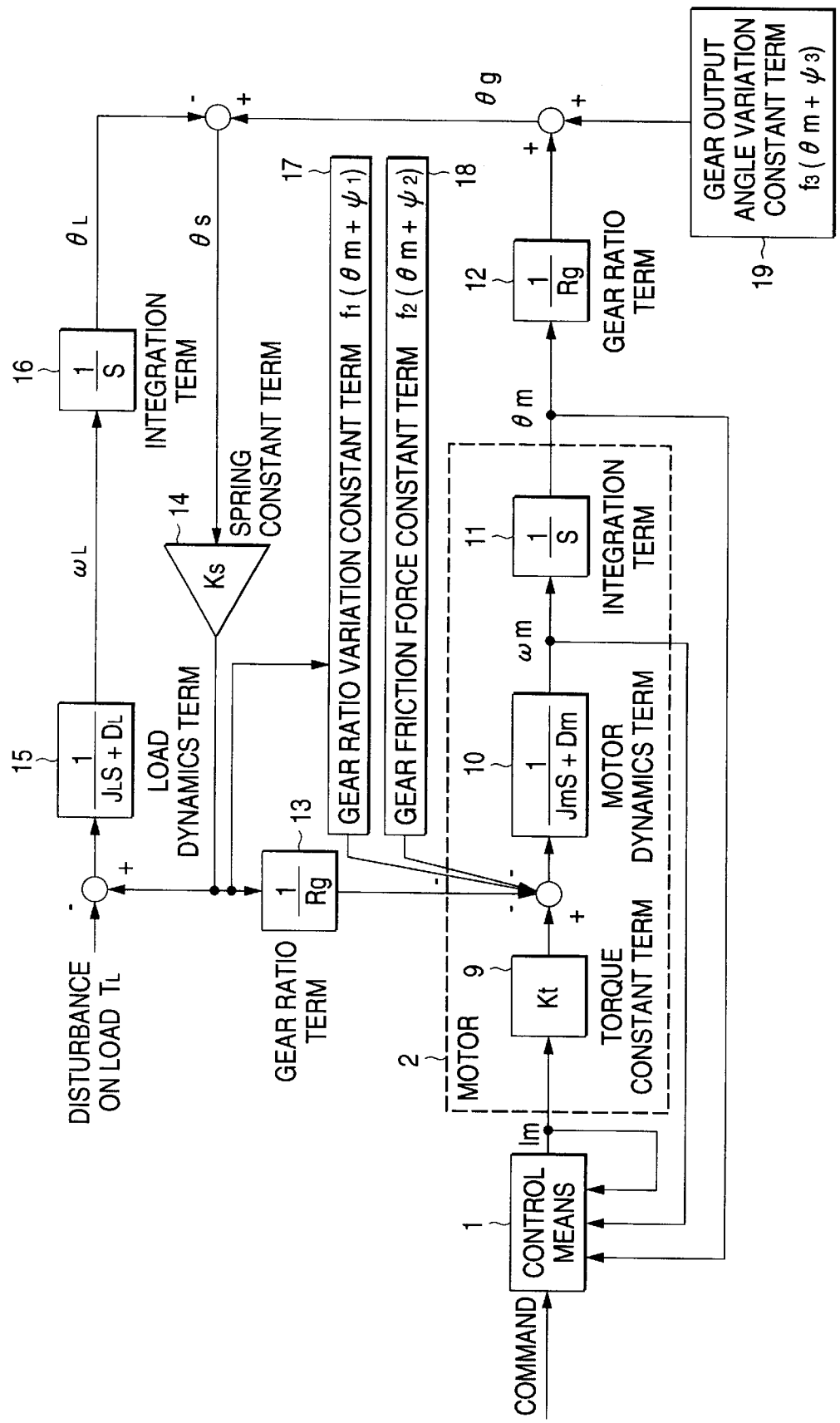
FIG. 1 is a block diagram to show the configuration of the invention.

Now, a description will be given in more detail of preferred embodiments of the invention with reference to the accompanying drawings.

A first embodiment of the invention will be discussed.

First, a configuration example of a torsion system containing an angle transmission error of a reduction gear unit 6 will be discussed with reference to FIG. 11. As shown here, a motor 2 controlled by control means 1 is connected to the center shaft of an input gear 4 in the reduction gear unit 6 and is connected to a load 8 via the center shaft of an output gear 5 in the reduction gear unit 6 and a spring component 7. Motor turning angle $\theta m$ of the motor 2 is detected by a sensor 3 and a detection signal of the angle is fed back into the control means 1 for controlling turning of the motor 2. When the motor 2 is driven, the motor turning angle $\theta m$ controlled by the control means 1 is transmitted to the load 8 via the input gear 4 and the output gear 5 in the reduction gear unit 6 and the spring component 7. At this time, it can be considered that gear ratio variation $\Delta R$ appears due to mechanical distortion errors of the input gear 4 and the output gear 5 in the reduction gear unit 6 and causes an angle transmission error of the reduction gear unit 6 to occur. Thus, it can be considered that the angle transmission error of the reduction gear unit 6 has a proportional relationship with the gear ratio variation $\Delta R$ caused by the mechanical distortion errors and moreover is a gear output angle variation, an output angle variation of the output gear 5 corresponding to the motor turning angle $\theta m$.

FIG. 1 is a block diagram of a control system modeling an angle transmission error of the reduction gear unit 6. In FIG. 1, motor current Im controlled by the control means 1 is converted into torque $Kt \cdot Im$ in a torque constant term 9 in the motor 2 and the torque $Kt \cdot Im$ is converted into speed $\omega m$ in a motor dynamics term 10 expressed by the reciprocal of the sum of motor shaft inertia Jm and motor shaft viscous resistance Dm. The speed $\omega m$ is converted into motor turning angle $\theta m$ in an integration term 11. Further, the motor turning angle $\theta m$ is multiplied by reduction gear ratio $1/Rg$ in a gear ratio term 12. At this time, a gear output angle variation proportional to gear ratio variation $\Delta R$ of the gear reduction unit 6 is output from a gear output angle variation constant term 19 and is added to output of the gear ratio term 12 to output gear output angle $\theta g$. Thus, it can be considered that the gear output angle variation is a mechanical distortion error occurring in response to the motor turning angle $\theta m$ and is caused by the gear ratio variation $\Delta R$. Therefore, the control means 1 can correct the angle transmission error of the reduction gear unit 6 by estimating the variation amount from the position feedback amount θm.

Since only the disturbance torque appearing in the motor 2 is handled in the angle transmission error correction of the reduction gear unit 6 in the prior art, responsivity of the control system is lowered in the vibration area caused by an angle transmission error as shown in Japanese Patent Laid-Open No. Hei 4-314109 or disturbance torque appearing at the shaft end of the motor 2 is all assumed to be an angle transmission error of the reduction gear unit 6 and the angle transmission error is corrected as shown in Japanese Patent Publication No. Sho 62-155348; responsivity of the control system is lowered. However, according to the embodiment, an angle transmission error of the reduction gear unit 6 is estimated from the motor turning angle θm, whereby the accuracy of a load tip locus can be improved without lowering the responsivity of the control system.

A second embodiment of the invention will be discussed. Parts identical with those previously described in the first embodiment are denoted by the same reference numerals in the second embodiment and will not be discussed again.

First, a configuration example of a torsion system containing an angle transmission error of a reduction gear unit 6 will be discussed with reference to FIG. 11. A motor 2 controlled by control means 1 is connected to the center shaft of an input gear 4 in the reduction gear unit 6 and is connected to a load 8 via the center shaft of an output gear 5 in the reduction gear unit 6 and a spring component 7. Thus, motor turning angle θm of the motor 2 controlled by the control means 1 is transmitted to the load 8 via the input gear 4 and the output gear 5 in the reduction gear unit 6 and the spring component 7. Since the output gear 5 and the load 8 are connected by the spring component 7, torsion angle θs of the difference between output angle θg of the output gear 5 and load position θL of the load 8 occurs. Torsion torque occurring in the spring component 7 due to the torsion angle θs occurs in the load 8 as an action force and also occurs as a reaction force of the motor 2 via the output gear 5 and the input gear 4. At this time, torsion torque occurring in the shaft of the output gear 5 occurs as a reaction force of the motor 2 via the shaft of the input gear 4 as a torsion torque variation occurring in proportion to gear ratio variation ΔR. In addition, a gear friction force occurs in the contact part between the input gear 4 and the output gear 5. The gear friction force also changes in magnitude due to mechanical distortions of the input gear 4 and the output gear 5. Specifically, when the distortion is convex, the gear friction force increases; when the distortion is concave, the gear friction force lessens. This means that the gear friction force varies in proportion to the gear ratio variation ΔR. The gear friction force also occurs via the shaft of the input gear 4.

FIG. 1 is a block diagram of a control system modeling an angle transmission error of the reduction gear unit 6. In FIG. 1, a gear output angle variation proportional to the gear ratio variation ΔR of the gear reduction unit 6 is generated from a gear output angle variation constant term 19 and is added to output of a gear ratio term 12 to output gear output angle θg. At this time, torsion angle θs of the difference between gear output angle θg and load position θL occurs and is multiplied by spring constant Ks in a spring constant term 14 to produce a torsion torque. This torsion torque is converted into speed ωL in a load dynamics term 15 expressed by the reciprocal of the sum of load shaft inertia JL and load shaft viscous resistance DL, then the speed ωL is output in an integration term 16 as the load position θL. Moreover, the torsion torque is multiplied by gear ratio variation ΔR generated in a gear ratio variation constant term 17 and occurs as a reaction force of the motor 2 as a torsion torque variation. Further, a gear friction force generated from a gear friction force constant term 18 also occurs as a reaction force of the motor 2. Thus, it can be considered that the torsion torque variation and the gear friction force are mechanical distortion errors occurring in response to the motor turning angle θm and are caused by the gear ratio variation ΔR. Therefore, the control means 1 can estimate the variation amount from the position feedback amount θm and correct the angle transmission error of the reduction gear unit 6.

Since only the disturbance torque appearing in the motor 2 is handled in the angle transmission error correction of the reduction gear unit in the prior art, responsivity of the control system is lowered in the vibration area caused by an angle transmission error or disturbance torque appearing at the shaft end of the motor is all assumed to be an angle transmission error of the reduction gear unit and the angle transmission error is corrected; responsivity of the control system is lowered. However, according to the embodiment, the angle transmission error of the reduction gear unit 6 can be separated into torsion torque variation and gear friction force and their respective factors can be estimated from the motor turning angle θm, so that the accuracy of a load tip locus can be furthermore improved without lowering the responsivity of the control system.

A third embodiment of the invention will be discussed. Parts identical with those previously described in the first and second embodiments are denoted by the same reference numerals in the third embodiment and will not be discussed again.

First, a configuration example of a torsion system containing an angle transmission error of a reduction gear unit 6 will be discussed with reference to FIG. 11. It can be considered that gear ratio variation ΔR appears due to mechanical distortion errors of an input gear 4 and an output gear 5 in a reduction gear unit 6 and causes an angle transmission error of the reduction gear unit 6 to occur. Since the mechanical distortion error appears on the circumference of the input gear 4 or the output gear 5, it can also be considered that the gear ratio variation ΔR corresponds to motor turning angle θm and appears as a 1-cycle gear output angle variation with one revolution of a motor or the output gear. Thus, the gear output angle variation having a proportional relationship with the gear ratio variation ΔR can be expressed by periodic function f3 (θm+ψ3) of the motor turning angle θm assuming that ψ3 is the phase difference between the motor turning angle θm and the input gear turning angle.

FIG. 1 is a block diagram of a control system modeling an angle transmission error of the reduction gear unit 6. In FIG. 1, the motor turning angle θm is multiplied by reduction gear ratio 1/Rg in a gear ratio term 12. At this time, gear output angle variation which is proportional to the gear ratio variation ΔR of the reduction gear unit 6 and can be expressed by the periodic function of the motor turning angle θm, f3 (θm+ψ3), is generated from a gear output angle variation constant term 19 and is added to output of the gear ratio term 12 to output gear output angle θg. Thus, the gear output angle variation can be expressed by periodic function f3 (θm+ψ3) of the motor turning angle θm. Therefore, control means 1 can estimate the variation amount f3 (θm+ψ3) from the position feedback amount θm and correct the angle transmission error of the reduction gear unit 6.

Since only the disturbance torque appearing in the motor is handled in the angle transmission error correction of the reduction gear unit in the prior art, responsivity of the control system is lowered in the vibration area caused by an angle transmission error or disturbance torque appearing at the shaft end of the motor is all assumed to be an angle transmission error of the reduction gear unit and the angle transmission error is corrected; responsivity of the control system is lowered. However, according to the embodiment, the angle transmission error of the reduction gear unit 6 is expressed by the periodic function f3 ($\theta$m+$\psi$3) of the motor turning angle $\theta$m and is estimated, whereby optimum system pole placement is enabled; the accuracy of a load tip locus can be improved without lowering the responsivity of the control system.

A fourth embodiment of the invention will be discussed. Parts identical with those previously described in the first, second, and third embodiments are denoted by the same reference numerals in the fourth embodiment and will not be discussed again.

First, a configuration example of a torsion system containing an angle transmission error of a reduction gear unit 6 will be discussed with reference to FIG. 11. Torsion torque occurring in the shaft of an output gear 5 occurs as a reaction force of a motor 2 via the shaft of an input gear 4 as a torsion torque variation occurring in proportion to gear ratio variation $\Delta$R. Since the gear ratio variation $\Delta$R occurs due to mechanical distortion errors appearing on the circumferences of the input gear 4 and the output gear 5 in the reduction gear unit 6, a 1-cycle variation occurs with one revolution of a motor or the output gear. Thus, the gear ratio variation can be expressed by periodic function f1 ($\theta$m+$\psi$1) of the phase difference $\psi$1 between the motor turning angle $\theta$m and the input gear turning angle assuming that $\psi$1 is the phase difference between the motor turning angle $\theta$m and the input gear turning angle.

A gear friction force occurs in the contact part between the input gear 4 and the output gear 5. The gear friction force also changes in magnitude due to mechanical distortions of the input gear 4 and the output gear 5. Thus, the gear friction force can be expressed by periodic function f2 ($\theta$m+$\psi$2) of the motor turning angle $\theta$m assuming that $\psi$2 is the phase difference between the motor turning angle $\theta$m and the input gear turning angle.

FIG. 1 is a block diagram of a control system modeling an angle transmission error of the reduction gear unit 6. In FIG. 1, torsion torque output from a spring constant term 14 is multiplied by gear ratio variation f1 ($\theta$m+$\psi$1) generated in a gear ratio variation constant term 17 and occurs as a reaction force of the motor 2 as a torsion torque variation. Gear friction force f2 ($\theta$m+$\psi$2) generated from a gear friction force constant term 18 also occurs as a reaction force of the motor 2. Thus, the gear ratio variation and the gear friction force can be expressed by the periodic functions f1 ($\theta$m+$\psi$1) and f2 ($\theta$m+$\psi$2) of the motor turning angle $\theta$m. Therefore, control means 1 can correct the angle transmission error of the reduction gear unit 6 by also estimating the variation amounts f1 ($\theta$m+$\psi$1) and f2 ($\theta$m+$\psi$2) from the position feedback amount $\theta$m.

Since only the disturbance torque appearing in the motor is handled in the angle transmission error correction of the reduction gear unit in the prior art, responsivity of the control system is lowered in the vibration area caused by an angle transmission error or disturbance torque appearing at the shaft end of the motor is all assumed to be an angle transmission error of the reduction gear unit and the angle transmission error is corrected; responsivity of the control system is lowered. However, according to the embodiment, the angle transmission error of the reduction gear unit 6 can also be separated into gear ratio variation and gear friction force, which are expressed by the periodic functions f1 ($\theta$m+$\psi$1) and f2 ($\theta$m+$\psi$2) of the motor turning angle $\theta$m and are estimated, whereby optimum system pole placement is enabled; the accuracy of a load tip locus can be furthermore improved without lowering the responsivity of the control system.

A fifth embodiment of the invention will be discussed. Parts identical with those previously described in the third and fourth embodiments are denoted by the same reference numerals in the third embodiment and will not be discussed again.

Figure 3:
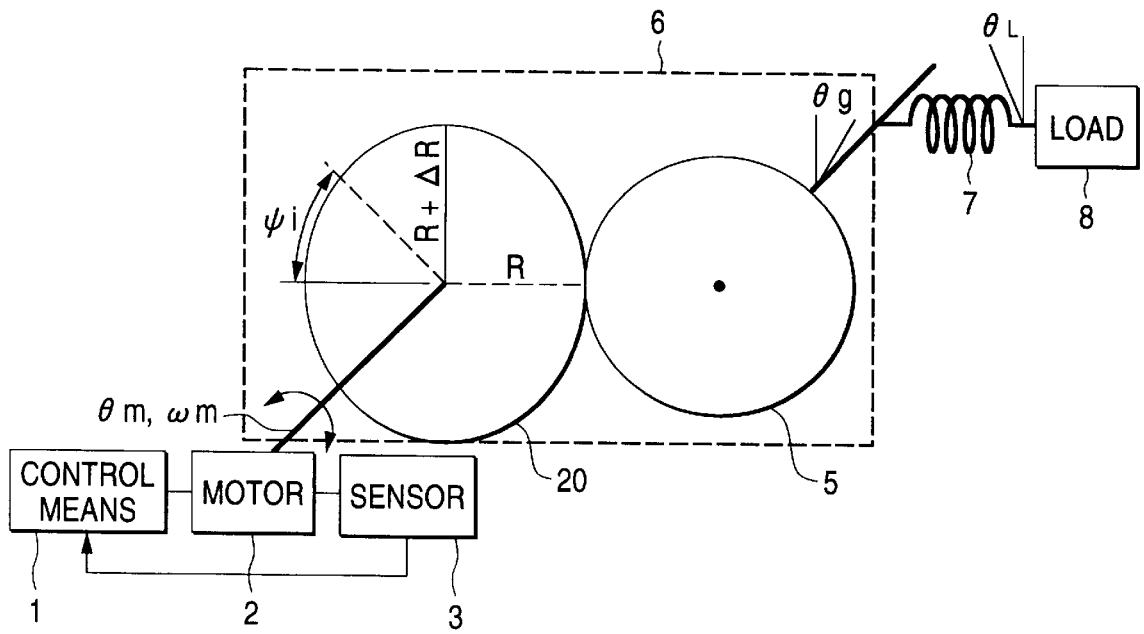
FIG. 3 is a 2-inertia-system control target model diagram containing a reduction gear unit of planet gear form.
Figure 4:
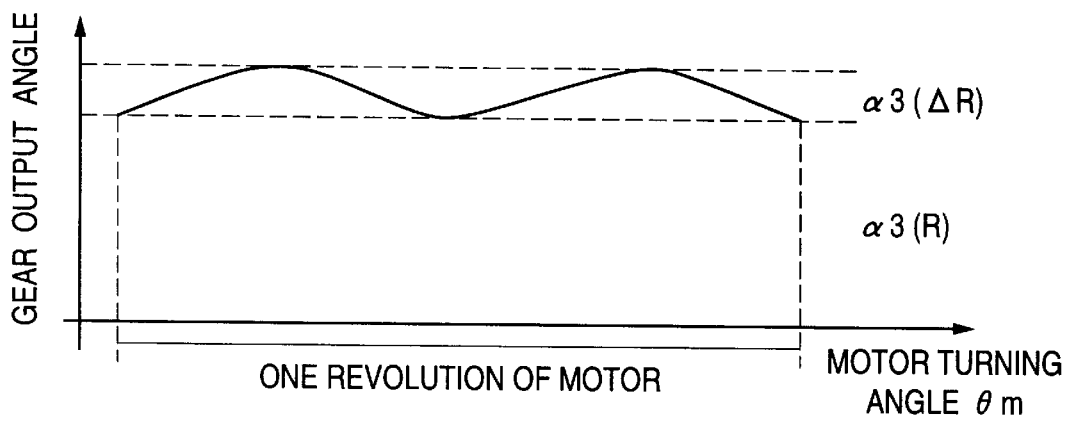
FIG. 4 is a graph to show the relationship between a motor turning angle and a gear output angle.

First, FIG. 3 shows a configuration example of a torsion system containing an angle transmission error of a reduction gear unit 6. As shown in FIG. 3, a motor 2 controlled by control means 1 is connected to the center shaft of an input gear 20 in the reduction gear unit 6 and is connected to a load gear 8 via the center shaft of an output gear 5 in the reduction gear unit 6 and a spring component 7. If the reduction gear unit 6 is of planet gear form, for the input gear 20, a continuous mechanical distortion error can be approximated as an ellipse gear. As shown in FIG. 4, assuming that the reduction gear ratio is 1/1, a 2-cycle variation occurs in gear output angle $\theta$g with one revolution of the motor. This output angle variation can be approximated as $\alpha$3 sin (2$\theta$m+$\psi$3) where $\alpha$3 is an output angle variation width, $\theta$m is a motor turning angle, and $\psi$3 is a phase angle between the motor turning angle $\theta$m and the input gear 20. The output angle variation width $\alpha$3 is proportional to gear ratio variation $\Delta$R. Likewise, the gear ratio variation can be expressed as $\alpha$1 sin (2$\theta$m+$\psi$1) and friction torque can be expressed as $\alpha$2 sin (2$\theta$m+$\psi$2) where $\alpha$1 is a gear ratio variation width and $\alpha$2 is a friction torque amplitude, which are proportional to the gear ratio variation $\Delta$R, and $\psi$1 and $\psi$2 are phase angles with the motor turning angle $\theta$m. Since they can be thus expressed by trigonometric functions of the motor turning angle $\theta$m, even if a mechanical distortion error becomes complicated, distortion can be approximated by combining the trigonometric functions.

Figure 2:
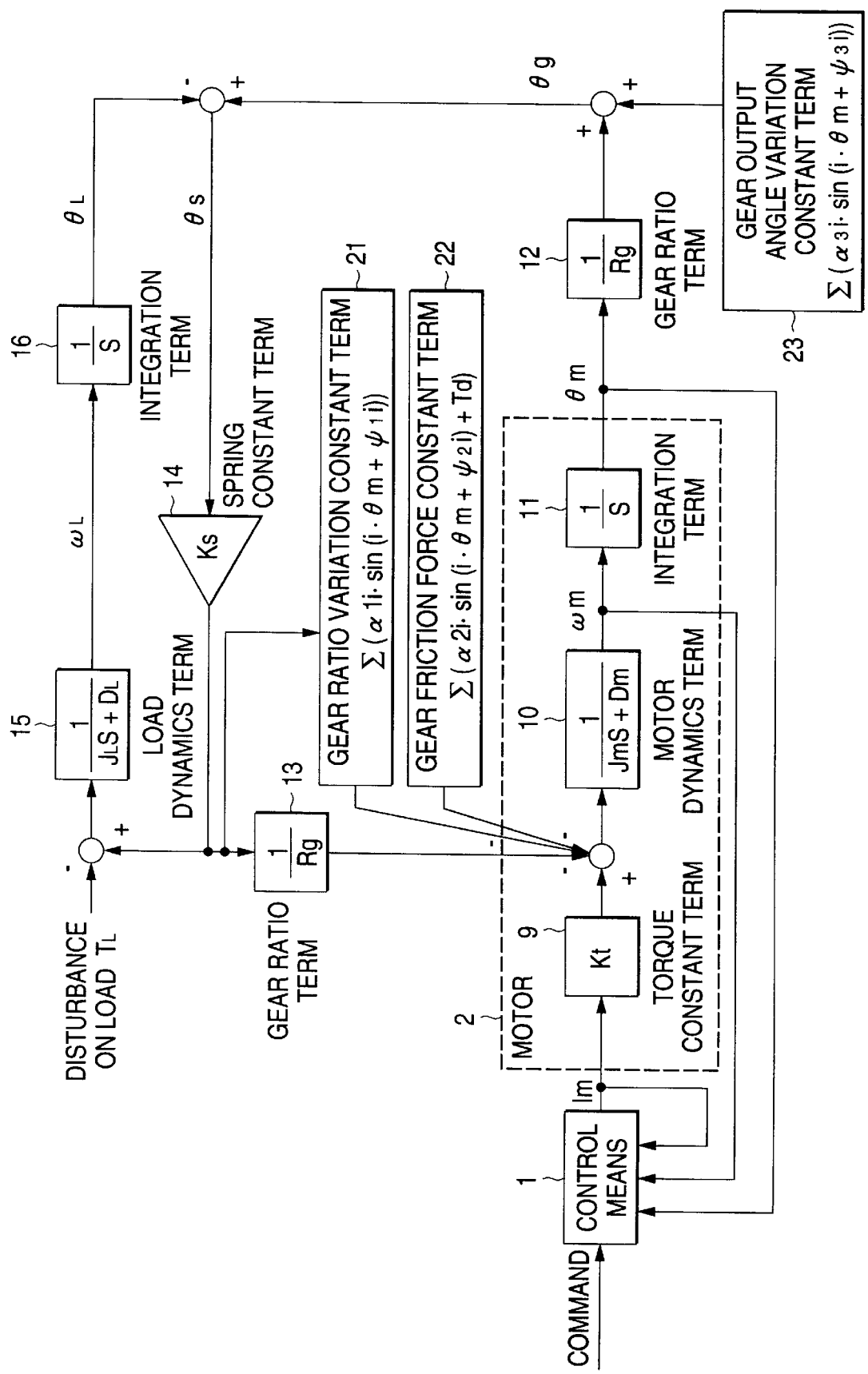
FIG. 2 is a block diagram to show the configuration of the invention.

Angle transmission errors of the reduction gear unit 6 are modeled and a block diagram of its control system is shown in FIG. 2. In the figure, gear output angle variation $\Sigma$ ($\alpha$3i·sin (i·$\theta$m+$\psi$3i)) is generated from a gear output angle variation constant term 23. Torsion torque output from a spring constant term 14 is multiplied by gear ratio variation $\Sigma$ ($\alpha$1i·sin (i·$\theta$m+$\psi$1i)) generated in a gear ratio variation constant term 21 and the result occurs as a reaction force of the motor 2 as a torsion torque variation. In addition, gear friction force ($\alpha$2i·sin (i·$\theta$m+$\psi$2i)) is also generated from a gear friction force constant term 22 as a reaction force of the motor 2. Since the angle transmission error of the reduction gear unit 6 is represented using the trigonometric functions, pole placement can calculated linearly and a control system can be designed easily. A trigonometric function table with the motor turning angle $\theta$m as an argument is provided, thereby building in the control means 1 only by addition and subtraction.

Since only the disturbance torque appearing in the motor is handled in the angle transmission error correction of the reduction gear unit in the prior art, responsivity of the control system is lowered in the vibration area caused by an angle transmission error or disturbance torque appearing at the shaft end of the motor is all assumed to be an angle transmission error of the reduction gear unit and the angle transmission error is corrected; responsivity of the control system is lowered.

However, according to the embodiment, the angle transmission error of the reduction gear unit 6 is separated into gear output angle variation, gear ratio variation, and gear friction force, which are expressed by the trigonometric functions of the motor turning angle θm and are estimated, whereby optimum system pole placement is enabled; the accuracy of a load tip locus can be furthermore improved without lowering the responsivity of the control system. Easy building in the control means 1 is also enabled.

A sixth embodiment of the invention will be discussed. Parts identical with those previously described in the third and fourth embodiments are denoted by the same reference numerals in the sixth embodiment and will not be discussed again.

Figure 5:
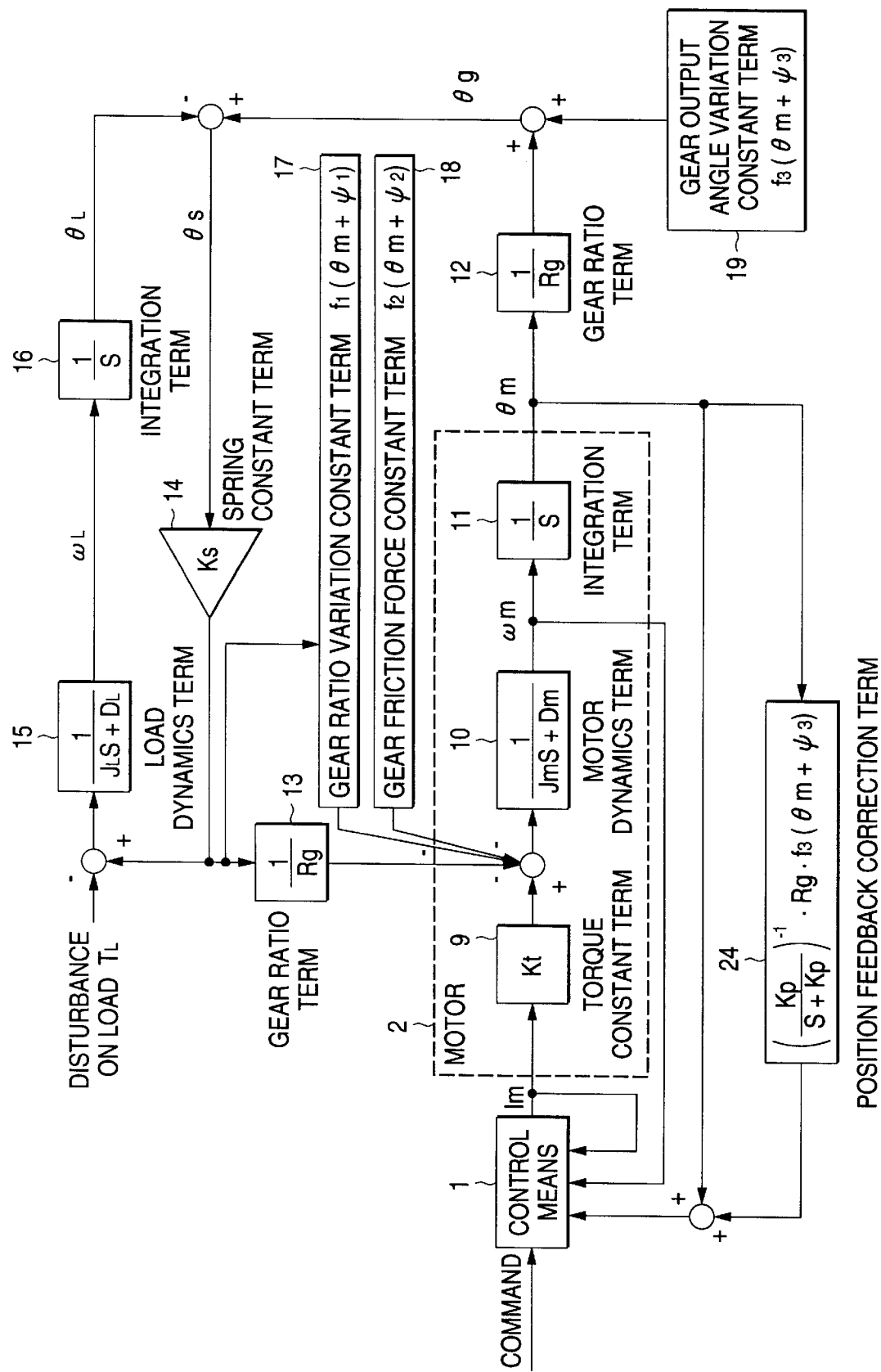
FIG. 5 is a block diagram to show the configuration of the invention.

First, FIG. 5 is a block diagram of a control system for modeling angle transmission errors of a reduction gear unit 6 and correcting the angle transmission errors. As shown in FIG. 5, distortion torque generated from a spring constant term 14, distortion torque variation proportional to gear ratio variation f1 (θm+ψ1) generated in a gear ratio variation constant term 17, and friction torque f2 (θm+ψ2) generated from a gear friction force constant term 18 occur each as a reaction force of the motor 2. These reaction forces occur as input torque loss of the motor 2, but occur in a control loop of the control means 1 and thus can be corrected by performing normal control. Therefore, the error amounts occurring in the gear ratio variation constant term 17 and the gear friction force constant term 18 can be ignored.

However, gear output angle variation f3 (θm+ψ3) occurring in a gear output angle variation constant term 19 occurs outside the control loop of the control means 1 and thus is hard to correct only by performing normal control. Thus, a position feedback correction term 24 converts the gear output angle variation f3 (θm+ψ3) into a shaft end value of the motor 2, multiplies the value by the reciprocal function of position responsivity Kp/(s+Kp) where Kp is a position gain, adds the result to position feedback, and feeds back the result into the control means 1. Therefore, the control means 1 can correct the gear output angle variation f3 (θm+ψ3) without receiving the effect of the position responsivity.

In the conventional angle transmission error correction, disturbance torque appearing at the shaft end of the motor is all assumed to be an angle transmission error of the reduction gear unit and the angle transmission error is corrected.

However, according to the embodiment, only the gear output angle variation is converted into a shaft end value of the motor 2 and the value is multiplied by the reciprocal function of position responsivity, then position is fed back, whereby a precise angle transmission error correction can be made without receiving the effect of the control target.

A seventh embodiment of the invention will be discussed. Parts identical with those previously described in the sixth embodiment are denoted by the same reference numerals in the seventh embodiment and will not be discussed again.

Figure 6:
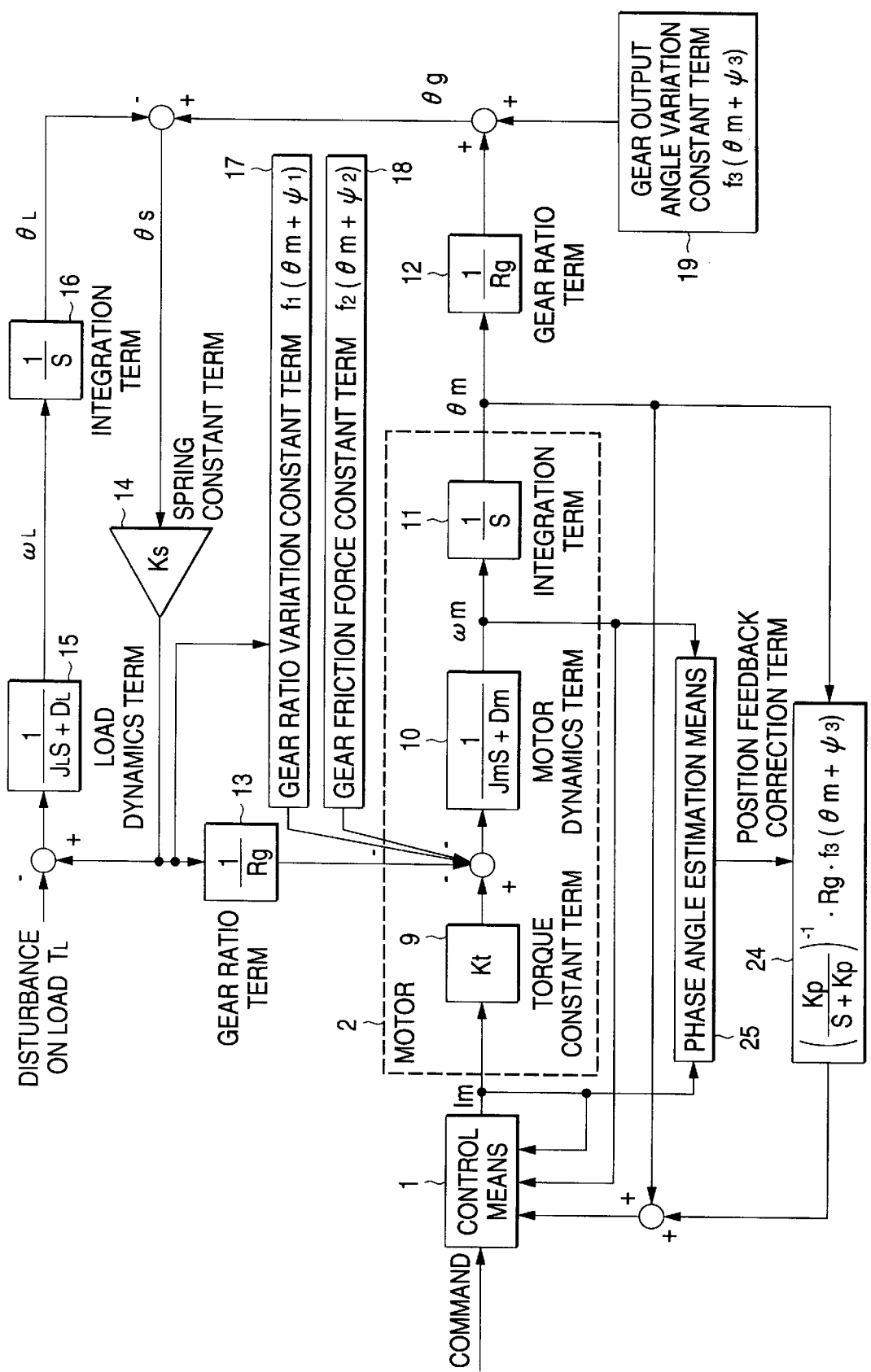
FIG. 6 is a block diagram to show the configuration of the invention.

First, FIG. 6 is a block diagram of a control system for modeling angle transmission errors of a reduction gear unit 6 and correcting the angle transmission errors and estimating a phase angle. As shown in FIG. 6, torsion angle θs can be expressed as $$\theta s = \frac{1}{1 + \frac{Ks}{s \times (s \times JL + DL)}} (\theta m + f3(\theta m + \Psi 3)) \quad \text{[Mathematical 1]}$$

Thus, torsion torque resulting from multiplying the torsion angle θs by a spring constant Ks in a spring constant term 14 appears as a reaction force of a motor 2. However, the reaction forces of the motor 2 include distortion torque variation having a proportional relationship with gear ratio variation f1 (θm+ψ1) generated in a gear ratio variation constant term 17 and gear friction torque f2 (θm+ψ2) generated from a gear friction force constant term 18 in addition to the torsion torque. When the reaction forces are sufficiently small and can be ignored, gear output angle variation f3 (θm+ψ3) can be expressed as $$f3(\theta m + \Psi 3) = \frac{(Kt \times Im - (s \times Jm + Dm) \times \omega m)\left(1 + \frac{Ks}{s \times (s \times JL + DL)}\right)}{Ks} - \theta m \quad \text{[Mathematical 2]}$$

from motor current Im, motor rotation speed ωm, and motor turning angle θm.

Phase angle estimation means 25 can estimate the gear output angle variation f3 (θm+ψ3) from the motor current Im, the motor rotation speed ωm, and the motor turning angle θm. If the reciprocal function of the gear output angle variation f3 (θm+ψ3) can be calculated, it is calculated and the phase angle ψ3 is found; if the reciprocal function cannot be calculated, a cycle of the gear output angle variation f3 (θm+ψ3) is observed and the phase angle ψ3 can be calculated by comparing with gear output angle variation f3 (θm+0).

In the conventional angle transmission error correction, disturbance torque appearing at the shaft end of the motor is all assumed to be an angle transmission error of the reduction gear unit and the angle transmission error is corrected. Thus, whenever the control target changes, the feature amount between the angle transmission error and disturbance torque must be measured. However, according to the embodiment, the phase angle of a gear output angle variation is calculated from disturbance estimation, whereby the angle transmission error can be corrected in real time without receiving the effect of the control target.

An eighth embodiment of the invention will be discussed. Parts identical with those previously described in the third and fourth embodiments are denoted by the same reference numerals in the eighth embodiment and will not be discussed again.

Figure 7:
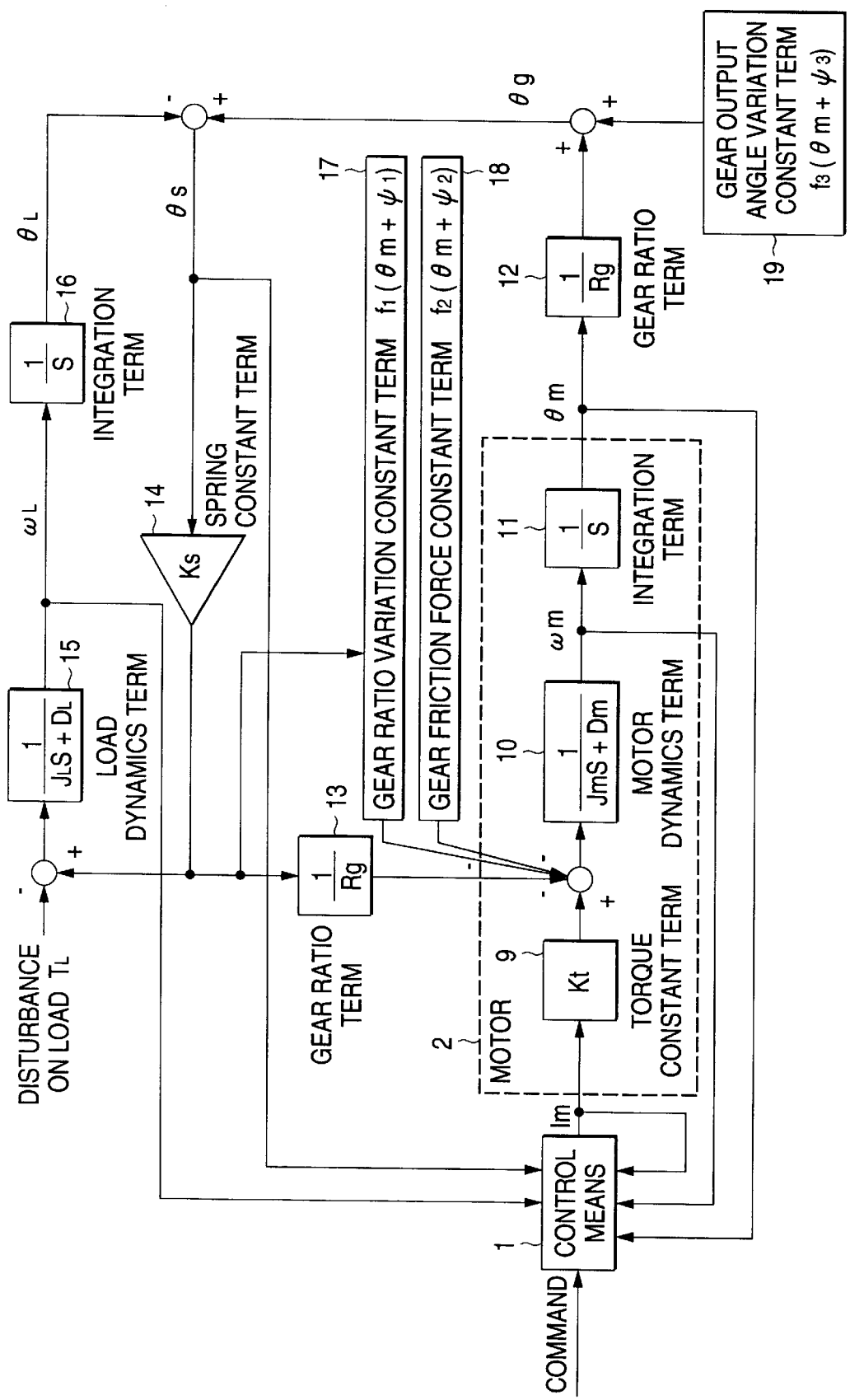
FIG. 7 is a block diagram to show the configuration of the invention.

First, angle transmission errors of a reduction gear unit 6 are modeled and a block diagram of a state feedback control system is shown in FIG. 7. In the figure, a motion equation of a control target of a torsion system containing an angle transmission error of the reduction gear unit 6 can be expressed as $$Jm \times \dot{\omega}m + Dm \times \omega m + \left(\frac{1}{Rg} + f1(\theta m + \Psi 1)\right) \times Ks \times \theta s + \quad \text{[Mathematical 3]}$$

$$f2(\theta m + \Psi 2) = Kt \times Im$$

$$\omega m \times \left(\frac{1}{Rg} + f3(\theta m + \Psi 3)\right) - \omega L = \dot{\theta s}$$

$$Ks \times \theta s = JL \times \dot{\omega}L + DL + \omega L$$

A state equation of converting load tip speed ωL, torsion angle θs, and motor rotation speed ωm into state amounts based on the motion equation becomes $$\begin{pmatrix} \dot{\omega}L \\ \dot{\omega}m \\ \dot{\theta}s \end{pmatrix} = \begin{pmatrix} \frac{-DL}{JL} & 0 & \frac{Ks}{JL} \\ 0 & \frac{-Dm}{Jm} & -\frac{Ks}{Jm} \times \left(\frac{1}{Rg} + f1(\theta m + \Psi 1)\right) \\ -1 & \frac{1}{Rg} + f3(\theta m + \Psi 3) & 0 \end{pmatrix} \begin{pmatrix} \omega L \\ \omega m \\ \theta s \end{pmatrix} + \begin{pmatrix} 0 \\ \frac{Kt}{Jm} \\ 0 \end{pmatrix} \left(Im - \frac{f2(\theta m + \Psi 2)}{Kt}\right)$$

[Mathematical 4]

Here, $$Im' = Im = \frac{f2(\theta m + \Psi 2)}{Kt}$$

[Mathematical 5]

is set to deform the state equation (Mathematical 4), whereby a characteristic equation of the system becomes
[Mathematical 6]
|s×E−A|=0
The time functions of the state amounts can be expressed using poles α1, α2, and α3 found from (Mathematical 6) and system behavior is determined by placement of the poles. Thus, the poles are changed, whereby the behavior of each state amount can be changed.

Then, control means 1 feeds back the state amounts of the load tip speed ωL, the torsion angle θs, and the motor rotation speed ωm and changes pole placement. At this time, assuming that a feedback coefficient is K, input becomes
[Mathematical 7]
U=−K×X+Im'
The state equation becomes
[Mathematical 8]
X=(A−B×K)×X+B×Im'
That is, the right-hand side A−BK becomes a new transition matrix. Thus, by changing the feedback coefficient K, desirable pole displacement is enabled and the whole system characteristic can be controlled.

In the conventional state feedback control design, disturbance torque appearing at the shaft end of the motor is all assumed to be an angle transmission error of the reduction gear unit and the angle transmission error is corrected. Thus, it is difficult to build an angle transmission error term in the state equation.

expressed by the periodic functions of motor turning angle θm, thus can be built in the state equation with errors not interfering with each other. Therefore, a system wherein the angle transmission error term of the reduction gear unit 6 is contained in pole and the angle transmission error of the reduction gear unit 6 is also considered can be designed and the control characteristic can be improved.

A ninth embodiment of the invention will be discussed. Parts identical with those previously described in the eighth embodiment are denoted by the same reference numerals in the ninth embodiment and will not be discussed again.

Figure 8:
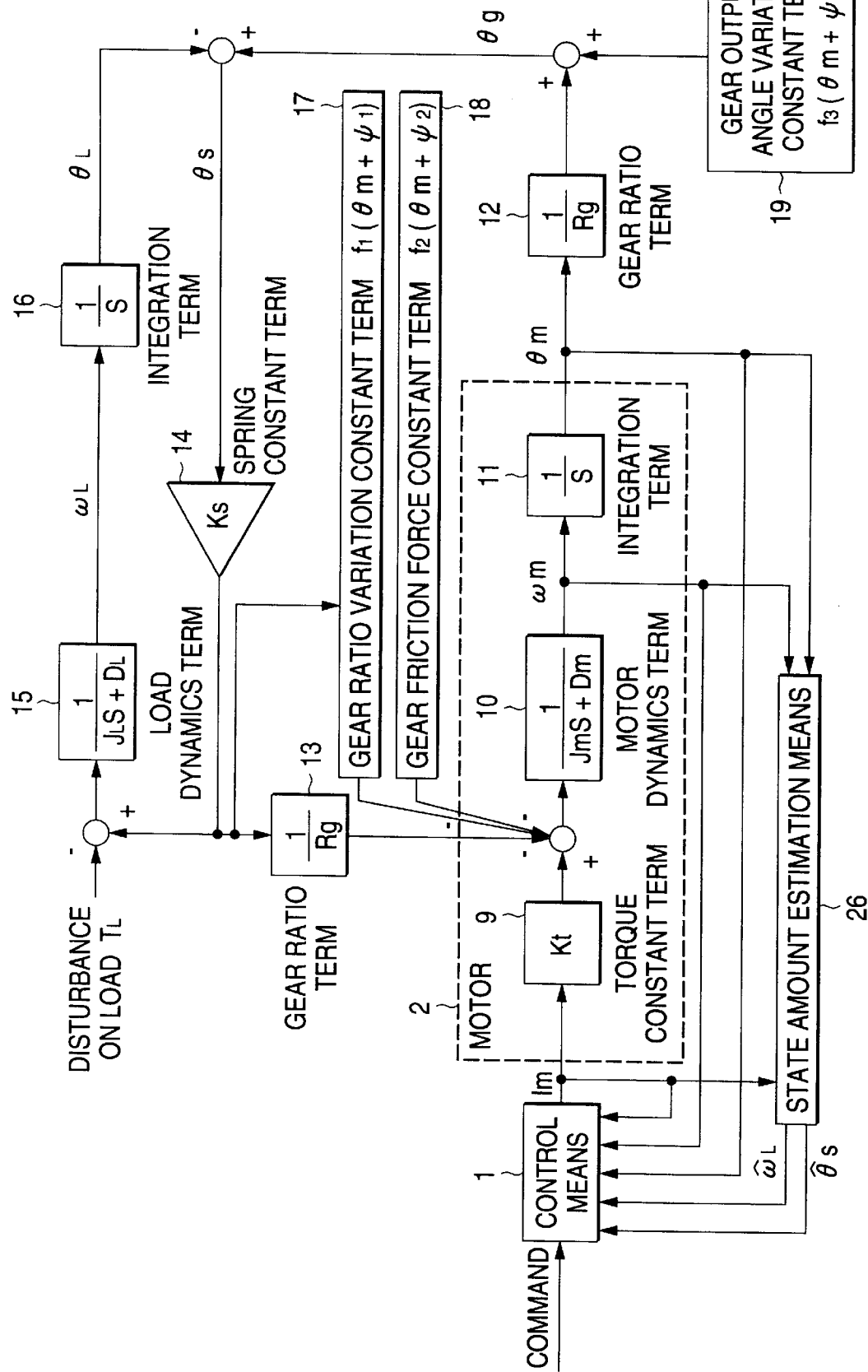
FIG. 8 is a block diagram to show the configuration of the invention.

First, FIG. 8 is a block diagram of a state feedback control system containing a state amount estimater for modeling angle transmission errors of a reduction gear unit 6. As shown in FIG. 8, motor turning angle θm, motor rotation speed ωm, and motor current Im are fed back into control means 1, thereby controlling a motor 2. Thus, state amount estimation means 26 estimates the state amounts of load tip speed ωL and torsion angle θs that cannot be directly detected without changing the configuration of the control means 1.

The state amount estimation means 26 is made of a quadratic state amount estimater using a state equation expressed by (Mathematical 4). If intermediate variable ζ is used, the state equation in a discrete system of the state amount estimater becomes $$\begin{pmatrix} \varepsilon 1(k+1) \\ \varepsilon 2(k+1) \end{pmatrix} = F \begin{pmatrix} \varepsilon 1(k) \\ \varepsilon 2(k) \end{pmatrix} + G \times \omega m + WB \times Im$$

[Mathematical 9]

where $$F = \begin{bmatrix} \frac{-DL}{JL} & \frac{Ks}{JL} & -\lambda 1 \times \frac{Ks}{Jm} \times \left(\frac{1}{Rg} + f1(\theta m + \Psi 1)\right) \\ -1 & -\lambda 2 \times \frac{Ks}{Jm} & \frac{1}{Rg} + f1(\theta m + \Psi 1) \end{bmatrix}$$

$$G = \begin{bmatrix} \lambda 1 \times \left(\frac{DL}{JL} - \frac{Dm}{Jm}\right) - \lambda 2 \times \frac{Ks}{JL} \times \lambda 1 \times \lambda 2 \times \left(\frac{Ks}{Jm} \times \left(\frac{1}{Rg} + f1(\theta m + \Psi 1)\right)\right) \\ \lambda 1 - \lambda 2 \times \frac{Dm}{Jm} + \lambda 2^2 \times \left(\frac{Ks}{Jm} \times \left(\frac{1}{Rg} + f1(\theta m + \Psi 1)\right)\right) + \frac{1}{Rg} + f3(\theta m + \Psi 3) \end{bmatrix}$$

$$WB = \begin{pmatrix} \lambda 1\left(\frac{Kt}{Jm}\right) \\ \lambda 2\left(\frac{Kt}{Jm}\right) \end{pmatrix}$$

However, in the embodiment, the angle transmission error of the reduction gear unit 6 can be decomposed into gear ratio variation f1 (θm+ψ1), friction force f2 (θm+ψ2), and gear output angle variation f3 (θm+ψ3), which can be Further, output expression of load tip speed ωL (K), torsion angle θs (K) becomes $$\begin{pmatrix} \omega L(k) \\ \theta s(k) \end{pmatrix} = \begin{pmatrix} \varepsilon 1 \\ \varepsilon 2 \end{pmatrix} + \begin{pmatrix} \lambda 1 \\ \lambda 2 \end{pmatrix} \times \omega m \qquad \text{[Mathematical 10]}$$

The estimation accuracy of the state amount estimation means 26 can be determined by λ1, λ2.

Figure 9:
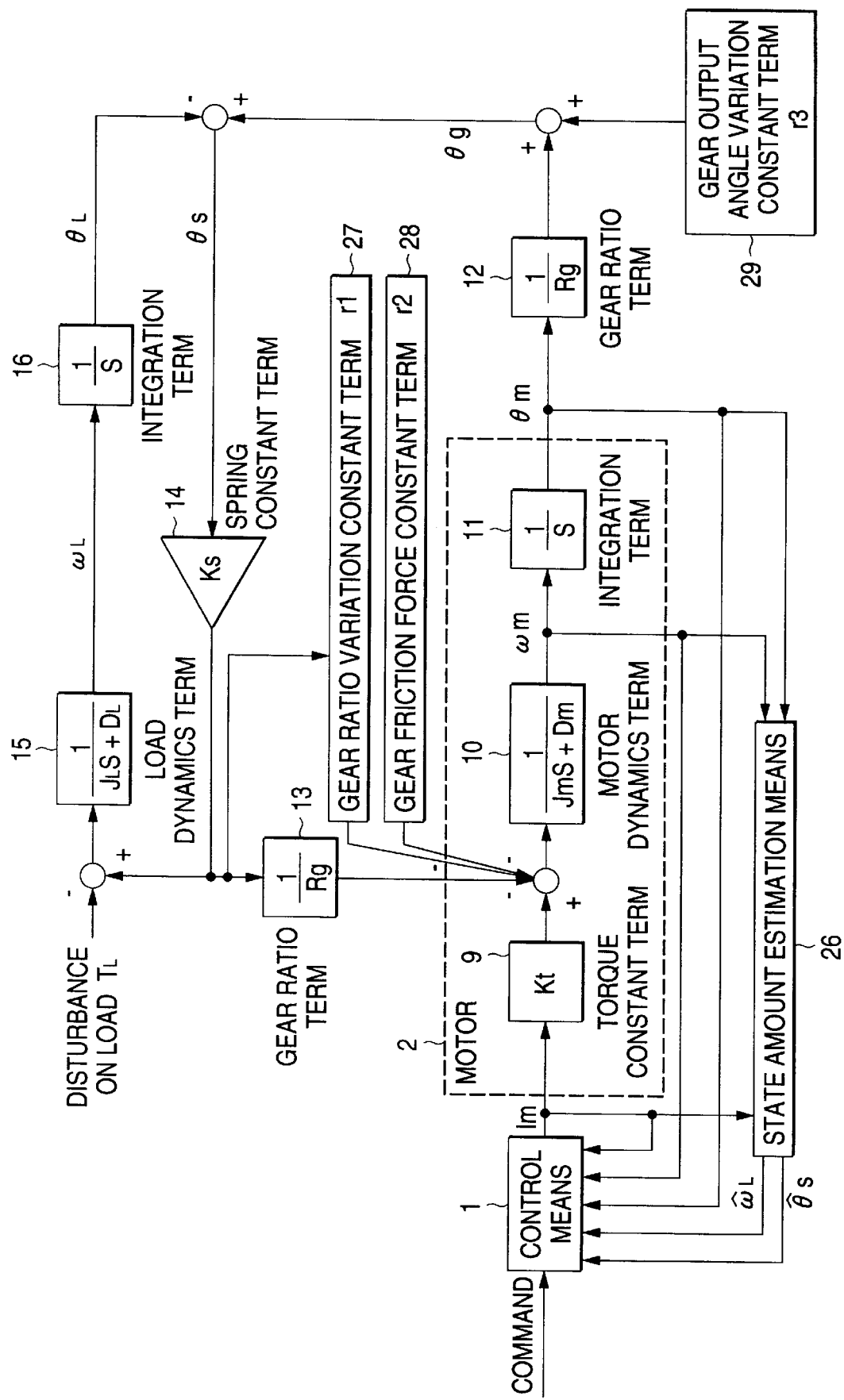
FIG. 9 is a block diagram to show the configuration of the invention.
Figure 10:
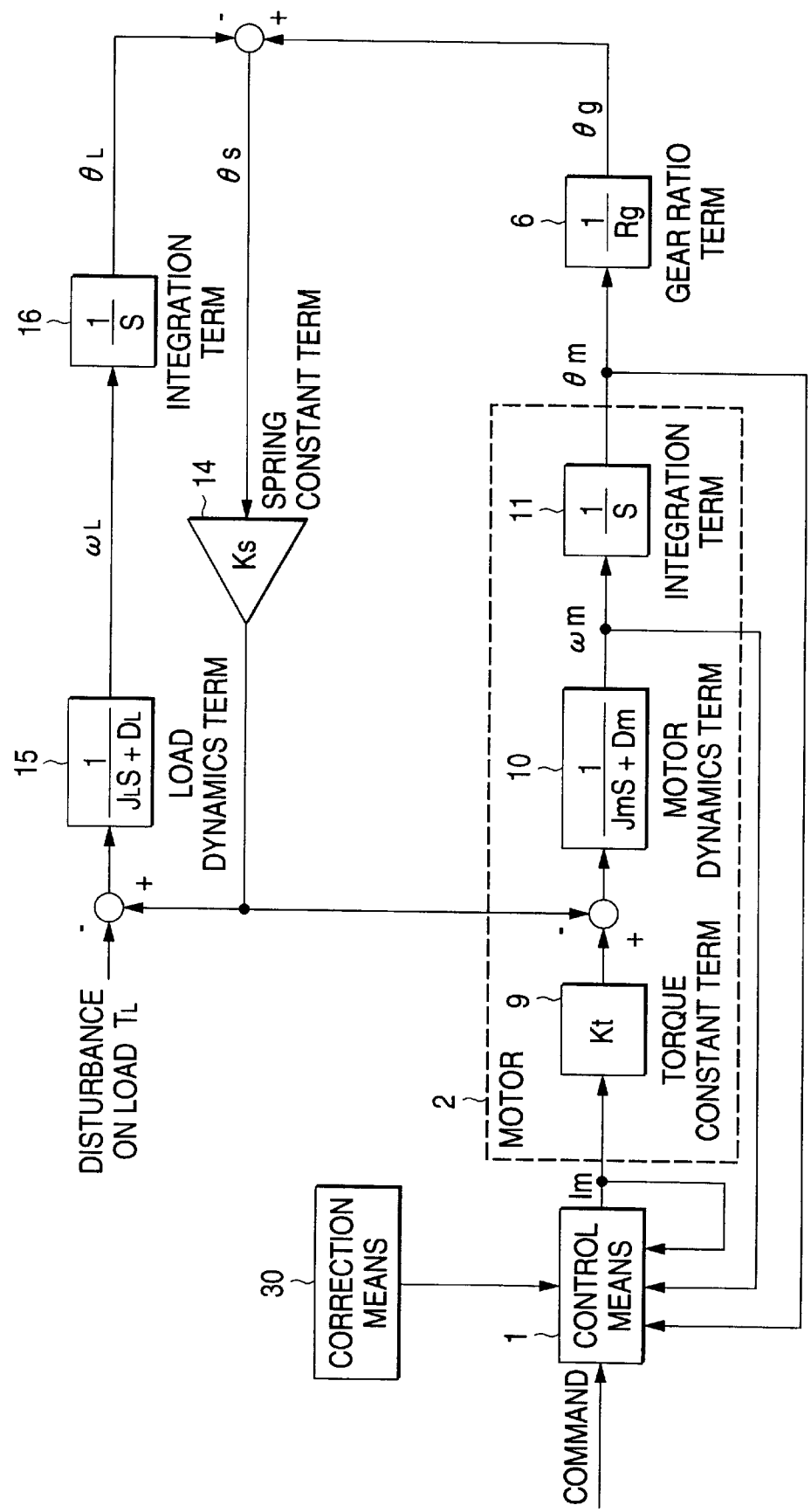
FIG. 10 is a block diagram to show a conventional configuration.

Since conventional state amount estimation means corrects disturbance torque appearing at the shaft end of the motor all as an angle transmission error of the reduction gear unit. Thus, it is difficult to build an angle transmission error term in the state amount estimation means.

ratio variation, a gear friction force, and a gear output angle variation of angle transmission error sources are periodic functions of motor turning angle θm, f1 (θm+ψ1), f2 (θm+ψ2), and f3 (θm+ψ3), (Mathematic 4), (Mathematic 9), and (Mathematic 10) become complicated structures and the poles also move depending on the motor turning angle θm. Thus, as shown in FIG. 9, the angle transmission error sources are set to constant terms r1, r2, and r3 of a gear ratio variation constant term 27, a gear friction force constant term 28, and a gear output angle variation constant term 29 respectively, whereby (Mathematic 4) becomes $$\begin{pmatrix} \dot{\omega}L \\ \dot{\omega}m \\ \dot{\theta}s \end{pmatrix} = \begin{pmatrix} \dfrac{-DL}{JL} & 0 & \dfrac{Ks}{JL} \\ 0 & \dfrac{-Dm}{Jm} & -\dfrac{Ks}{Jm} \times \left(\dfrac{1}{Rg} + r1\right) \\ -1 & \dfrac{1}{Rg} + r3 & 0 \end{pmatrix} \begin{pmatrix} \omega L \\ \omega m \\ \theta s \end{pmatrix} + \begin{pmatrix} 0 \\ \dfrac{Kt}{Jm} \\ 0 \end{pmatrix} \left( Im - \dfrac{r2}{Kt} \right) \qquad \text{[Mathematic 12]}$$

[Mathematic 10] becomes $$\begin{pmatrix} \varepsilon 1(k+1) \\ \varepsilon 2(k+1) \end{pmatrix} = F \begin{pmatrix} \varepsilon 1(k) \\ \varepsilon 2(k) \end{pmatrix} + G \times \omega m + WB \times Im \qquad \text{[Mathematic 13]}$$

where $$F = \begin{bmatrix} \dfrac{-DL}{JL} & \dfrac{Ks}{JL} & -\lambda 1 \times \dfrac{Ks}{Jm} \times \left(\dfrac{1}{Rg} + r1\right) \\ -1 & -\lambda 2 \times \dfrac{Ks}{Jm} & \dfrac{1}{Rg} + r1 \end{bmatrix}$$

$$G = \begin{bmatrix} \lambda 1 \times \left(\dfrac{DL}{JL} - \dfrac{Dm}{Jm}\right) - \lambda 2 \times \dfrac{Ks}{JL} + \lambda 1 \times \lambda 2 \times \left(\dfrac{Ks}{Jm} \times \left(\dfrac{1}{Rg} + r1\right)\right) \\ \lambda 1 - \lambda 2 \times \dfrac{Dm}{Jm} + \lambda 2^2 \times \left(\dfrac{Ks}{Jm} \times \left(\dfrac{1}{Rg} + r1\right)\right) + \dfrac{1}{Rg} + r3 \end{bmatrix}$$

$$WB = \begin{pmatrix} \lambda 1 \left(\dfrac{Kt}{Jm}\right) \\ \lambda 2 \left(\dfrac{Kt}{Jm}\right) \end{pmatrix}$$

However, according to the embodiment, the angle transmission error of the reduction gear unit 6 can be decomposed into gear ratio variation f1 (θm+ψ1), friction force f2 (θm+ψ2), and gear output angle variation f3 (θm+ψ3), which can be expressed by the periodic functions of motor turning angle θm. Thus, a state amount estimater wherein the angle transmission error term of the reduction gear unit 6 is contained can be designed; the state amount estimation accuracy can be improved and the state feedback control performance can also be improved.

A tenth embodiment of the invention will be discussed. Parts identical with those previously described in the ninth embodiment are denoted by the same reference numerals in the tenth embodiment and will not be discussed again.

First, FIG. 9 is a block diagram of a state feedback control system containing a state amount estimater for modeling angle transmission errors of a reduction gear unit 6 with constant terms. A characteristic equation of the control system becomes
[Mathematical 11]

|s×E−(A−B×K)|=0

Poles of the characteristic equation are calculated and the pole replacement is changed with a feedback coefficient, thereby designing an optimum system. By changing λ1, λ2 in (Mathematic 9), (Mathematic 10), optimum state amount estimation means 26 can be designed. However, since a gear Thus, state feedback and state amount estimater poles can be calculated according to (Mathematic 12) and (Mathematic 13) containing the constant terms r1, r2, and r3. Even for the maximum, minimum value of each constant r1, r2, r3, an optimum system or pole placement with good estimation accuracy is made, whereby easy design is enabled.

Thus, state feedback control and state amount estimater containing an angle transmission error term of the reduction gear unit 6 can be easily designed and control performance can be improved.

An eleventh embodiment of the invention will be discussed. Parts identical with those previously described in the first and second embodiments are denoted by the same reference numerals in the eleventh embodiment and will not be discussed again.

Figure 11:
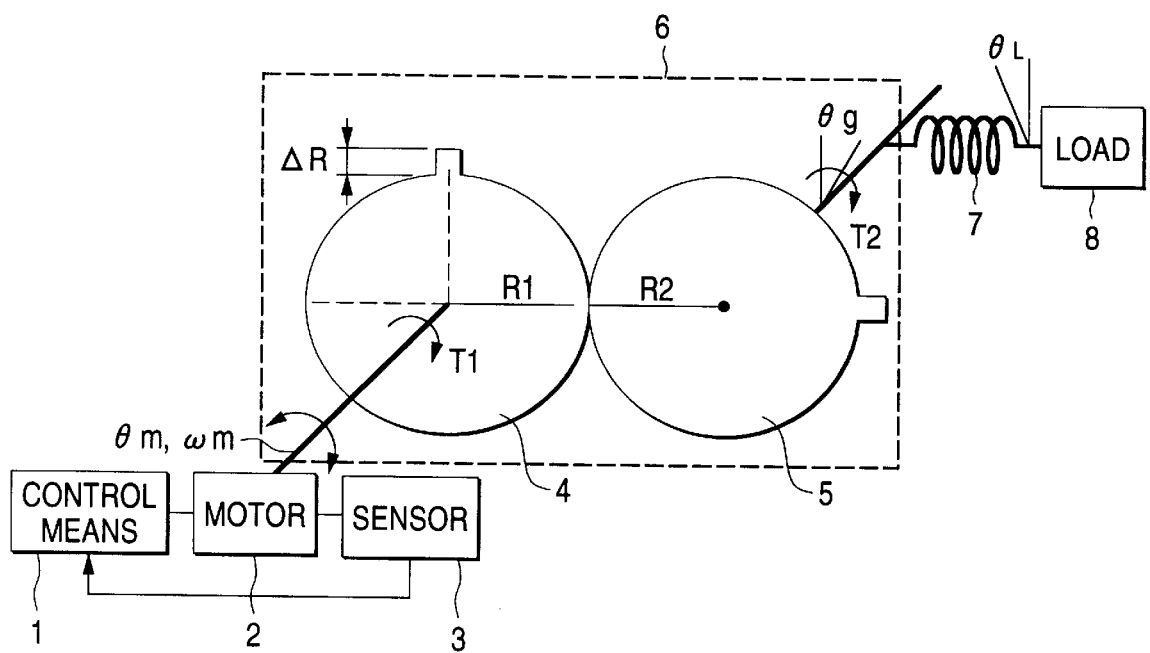
FIG. 11 is a 2-inertia-system control target model diagram containing a reduction gear unit.

First, FIG. 11 shows a configuration example of a torsion system containing an angle transmission error of a reduction gear unit 6. Assuming that the radius of an input gear 4 is R1 and that the radius of an output gear 5 is R2, motor turning angle θm output from a motor 2 is converted into output angle θg of gear output 3 multiplied by reduction gear ratio R1/R2 and the conversion result is output. At this time, assuming that torsion torque occurring in a spring component 7 and occurring on the shaft of the output gear 5 is T2 and that a reaction force occurring on the shaft of the motor 2 is T1, power balance is maintained with the relation $$\frac{T1}{R1} = \frac{T2}{R2} \quad \text{[Mathematical 14]}$$

Thus, torsion torque occurring from the spring component 7 is multiplied by the reduction gear ratio R1/R2 and occurs as a reaction force of the motor 2.

Next, angle transmission errors of the reduction gear unit 6 are modeled and a block diagram of its control system is shown in FIG. 1. In the figure, torsion torque output from a spring constant term 14 is multiplied by reduction gear ratio 1/Rg (R1/R2) in a gear ratio term 13 and resultant reaction force occurs in the motor 2.

In conventional control of a torsion system containing a reduction gear unit, control is performed without identifying the reduction gear unit with an accurate model, thus there is a limit to improvement in control performance.

However, according to the embodiment, the reduction gear ratio is considered for the reaction force of torsion torque on the motor 2, whereby a more accurate control target model can be identified and optimum system pole placement is enabled; control performance can be improved by introducing the modern control theory.

As seen from the description made so far, according to the invention, optimum system pole placement is enabled without receiving the effect of the control target and particularly the control performance of the torsion control system can be improved without lowering the responsivity of the control system. Thus, machine tip locus precision of a robot, etc., can be improved and work accuracy can be improved; the invention is extremely useful on practical application.

What is claimed is:

1. A control system comprising:
   a reduction gear unit for connection to a load, said reduction gear unit containing gears;
   a motor being disposed on an input side of said reduction gear unit;
   a sensor for detecting a turning angle of said motor and generating an output corresponding to said turning angle;
   means for estimating a torsion torque variation;
   control means for receiving said output from said sensor and controlling turning of said motor; and
   gear output angle variation estimation means for estimating a gear output angle variation of said reduction gear unit based on the motor turning angle; and
   wherein said gear output angle variation and said torsion torque variation are estimated independent of each other.

2. A control system comprising:
   a reduction gear unit for connection to a load, said reduction gear unit containing gears;
   a motor being disposed on an input side of said reduction gear unit;
   a sensor for detecting a turning angle of said motor and generating an output corresponding to said turning angle;
   control means for receiving said output from said sensor and controlling turning of said motor;
   gear output angle variation estimation means for estimating a gear output angle variation of said reduction gear unit based on the motor turning angle;
   gear ratio variation estimation means for estimating a torsion torque variation of said reduction gear unit based on the motor turning angle; and
   gear friction force estimation means for estimating a gear friction force of said reduction gear unit based on the motor turning angle; and
   wherein said gear output angle variation, said torsion torque variation, and said gear friction force are estimated independent of each other.

3. The control system as claimed in claim 1 or 2 wherein said gear output angle variation estimation means estimates the gear output angle variation of said reduction gear unit using a function comprising the motor turning angle and a phase angle between the motor turning angle and a gear turning angle of the reduction gear unit.

4. The control system as claimed in claim 2 wherein said gear output angle variation estimation means estimates the gear output angle variation of said reduction gear unit using a first function comprising the motor turning angle and a phase angle between the motor turning angle and a gear turning angle of the reduction gear unit, wherein said gear ratio variation estimation means estimates the torsion torque variation of said reduction gear unit using a second function comprising the motor turning angle and a phase angle between the motor turning angle and the gear turning angle, and wherein said gear friction force estimation means estimates the gear friction force of said reduction gear unit using a third function comprising the motor turning angle and a phase angle between the motor turning angle and the gear turning angle.

5. The control system as claimed in claim 4 wherein the first, second, and third functions are trigonometric functions.

6. The control system as claimed in claim 4 wherein the first function used with said gear output angle variation estimation means is multiplied by a reciprocal function of position response to generate a position feedback signal.

7. The control system as claimed in claim 4 further comprising phase angle estimation means for estimating the phase angle from a motor driving current and a motor rotation speed.

8. The control system as claimed in claims 1 or 2 wherein a load tip speed of the load and a torsion angle of a tip of the load are input to said control means for suppressing vibration of the load.

9. The control system as claimed in claims 1 or 2 further comprising state amount estimation means for estimating a load tip speed of the load and a torsion angle of a tip of the load from a motor driving current and a motor rotation speed, or the motor turning angle.

10. A control system comprising:
   a reduction gear unit for connection to a load, said reduction gear unit containing gears;
   a motor disposed on an input side of said reduction gear unit;
   a sensor for detecting a turning angle of said motor and generating an output corresponding to said turning angle;
   control means for receiving said output from said sensor and controlling turning of said motor; and
   state amount estimation means for estimating a load tip speed of the load and a torsion angle of a tip of the load from a motor driving current and a motor rotation speed, or the motor turning angle, said state amount estimation means utilizing:
      a gear output angle variation constant that estimates a gear output angle variation of said reduction gear unit;
      a gear ratio variation constant that estimates a gear ratio variation of said reduction gear unit; and a gear friction force constant that estimates a gear friction force of said reduction gear unit.

11. A method of controlling a motor which drives a reduction gear unit connected to a load, said method comprising the steps of:

detecting a turning angle of said motors;

estimating a torsion torque variation;

estimating a gear output angle variation of said reduction gear unit from the detected motor turning angle; and using the estimated gear output angle variation to control turning of the motor; and wherein said gear output angle variation and said torsion torque variation are estimated independent of each other.

12. A method of controlling a motor which drives a reduction gear unit connected to a load, said control method comprising the steps of:

detecting a turning angle of said motor;

estimating a gear output angle variation, a torsion torque variation, and a gear friction force of said reduction gear unit from the detected motor turning angle; and using the estimated gear output angle variation, the estimated torsion torque variation, and the estimated gear friction force to control turning of the motor; and wherein said gear output angle variation, said torsion torque variation, and said gear friction force are estimated independent of each other.

13. The control method as claimed in claim 11 or 12 wherein the gear output angle variation of said reduction gear unit is estimated using a function comprising the motor turning angle and a phase angle between the motor turning angle and a gear turning angle of the reduction gear unit.

14. The control method as claimed in claim 12 wherein the gear output angle variation, the torsion torque variation, and the gear friction force of said reduction gear unit are estimated using functions comprising the motor turning angle and phase angles between the motor turning angle and the gear turning angle.

15. The control method as claimed in claim 14 wherein the functions are trigonometric functions.

16. The control system as claimed in claim 14 wherein the function used to estimate the gear output angle variation is multiplied by a reciprocal function of position response to generate a signal used for performing position feedback control.

17. The control method as claimed in any of claims 14–16 further comprising the step of estimating the phase angle from a motor driving current and a motor rotation speed.

18. The control method as claimed in any of claims 14–16 wherein a load tip speed of the load and a torsion angle of a tip of the load are input to said control means for suppressing vibration of the load.

19. The control method as claimed in any of claims 14–16 further comprising the step of estimating a load tip speed of the load and a torsion angle of a tip of the load from a motor driving current and a motor rotation speed, or the motor turning angle.

20. A method of controlling a motor which drives a reduction gear unit connected to a load, said method comprising the steps of:

estimating a load tip speed of the load and a torsion angle of a tip of the load from a motor driving current and a motor rotation speed, or the motor turning angle, said estimating step using:

a gear output angle variation constant that estimates a gear output angle variation of said reduction gear unit;

a gear ratio variation constant that estimates a gear ratio variation of said reduction gear unit; and a gear friction force constant that estimates a gear friction force of said reduction gear unit; and controlling output to the motor from the gear output angle variation constant, the gear ratio variation constant, the gear friction force constant, and the estimated torsion angle.

21. A method of controlling a motor which drives a reduction gear unit connected to a load, said reduction gear unit having first and second gears, said method comprising the steps of:

estimating a torsion torque arising from the connection of the reduction gear unit to the load;

estimating a reaction force at the motor from the torsion torque using a ratio of the radii of the first and second gears; and using the estimated reaction force to control turning of the motor.

* * * * *

UNITED STATES PATENT AND TRADEMARK OFFICE
CERTIFICATE OF CORRECTION

PATENT NO. : 5,986,424
DATED : November 16, 1999
INVENTOR(S) : Nakatsuka et al.

It is certified that error appears in the above-indentified patent and that said Letters Patent is hereby corrected as shown below:

Column 10, Line 50, after "force", insert --$\Sigma$--.

Signed and Sealed this

Third Day of April, 2001

Attest:

NICHOLAS P. GODICI

*Attesting Officer*     Acting Director of the United States Patent and Trademark Office